United States Patent [19]
Fong et al.

[11] Patent Number: 5,152,976
[45] Date of Patent: Oct. 6, 1992

[54] PROCESS FOR PRODUCING HIGH PURITY HYDROGEN

[75] Inventors: Wing-Chiu F. Fong, Yorktown Heights, N.Y.; Henry C. Chan, Bellaire, Tex.; Robert M. Suggitt, Wappingers Falls; Manuel E. Quintana, Scarsdale, both of N.Y.

[73] Assignee: Texaco Inc., White Plains, N.Y.

[21] Appl. No.: 614,335

[22] Filed: Nov. 16, 1990

[51] Int. Cl.$^5$ .................................. C01B 3/26
[52] U.S. Cl. ........................ 423/652; 423/655; 423/656
[58] Field of Search ............... 423/359, 651, 652, 655, 423/656

[56] References Cited

U.S. PATENT DOCUMENTS

| | | | |
|---|---|---|---|
| 3,479,298 | 11/1969 | Sze et al. | 252/373 |
| 3,839,847 | 10/1974 | Banikiotes et al. | 55/58 |
| 3,859,428 | 1/1975 | Massle | 423/651 |
| 3,864,465 | 2/1975 | Hoffert | 423/648 |
| 3,920,804 | 11/1975 | Seltzer | 423/650 |
| 3,947,551 | 3/1976 | Parrish | 423/652 |
| 3,965,253 | 6/1976 | Miller et al. | 423/651 |
| 4,025,318 | 5/1977 | Moody et al. | 48/213 |
| 4,077,779 | 3/1978 | Sircar et al. | 55/25 |
| 4,171,206 | 10/1979 | Sircar | 55/26 |
| 4,254,094 | 3/1981 | Hegarty | 423/648 |
| 4,264,567 | 4/1981 | Pinto | 423/359 |
| 4,333,744 | 6/1982 | Fuderer | 55/25 |
| 4,338,292 | 7/1982 | Duranleau et al. | 423/656 |
| 4,398,926 | 8/1983 | Doshi | 55/16 |
| 4,414,191 | 11/1983 | Fuderer | 423/359 |
| 4,447,410 | 5/1984 | Giammarco | 423/655 |
| 4,491,573 | 1/1985 | Stonner et al. | 423/652 |
| 4,553,981 | 11/1985 | Fuderer | 48/62 |
| 4,572,829 | 2/1986 | Fuderer | 423/359 |
| 4,592,860 | 6/1986 | Fuderer | 252/376 |
| 4,592,903 | 6/1986 | Osman et al. | 423/359 |
| 4,654,063 | 3/1987 | Anvil et al. | 62/18 |
| 4,696,680 | 9/1987 | Ghate et al. | 55/25 |
| 4,711,773 | 12/1987 | Mesters et al. | 423/655 |
| 4,725,381 | 2/1988 | Pinto | 252/376 |
| 4,732,596 | 3/1988 | Nicholas et al. | 62/18 |
| 4,740,222 | 4/1988 | Mehra | 62/17 |
| 4,778,670 | 10/1988 | Pinto | 423/650 |
| 4,790,858 | 12/1988 | Sircar | 55/25 |
| 4,836,833 | 6/1989 | Nicholas et al. | 55/16 |
| 4,869,894 | 9/1989 | Wang et al. | 423/650 |
| 4,891,187 | 1/1990 | Jungfer et al. | 423/248 |
| 4,897,253 | 1/1990 | Jenkins | 423/651 |
| 4,906,448 | 3/1990 | Sauvion et al. | 423/437 |
| 4,908,199 | 3/1990 | Sauvion et al. | 423/437 |
| 4,963,339 | 10/1990 | Krishnamurthy et al. | 423/437 |
| 4,980,145 | 12/1990 | Hsiung et al. | 423/437 |
| 5,000,925 | 3/1991 | Krishnamurthy et al. | 422/189 |

*Primary Examiner*—Ferris Lander
*Attorney, Agent, or Firm*—Robert A. Kulason; James J. O'Loughlin; Dominick G. Vicari

[57] ABSTRACT

A process for producing high purity hydrogen is disclosed. Specifically, the process includes (1) partially oxidizing a refinery offgas feedstock to produce a synthesis gas mixture of carbon monoxide and hydrogen, (2) reacting the synthesis gas mixture with steam to convert the carbon monoxide into a raw gas mixture which primarily includes carbon dioxide and hydrogen, and (3) purifying the raw gas mixture to produce high purity hydrogen and a reject gas mixture of impurities. In a preferred embodiment, the purification step occurs in a pressure swing adsorption unit.

Alternative embodiments are also described, each of which essentially involve the optional treatment and/or use of the reject gas mixture of impurities.

26 Claims, 1 Drawing Sheet

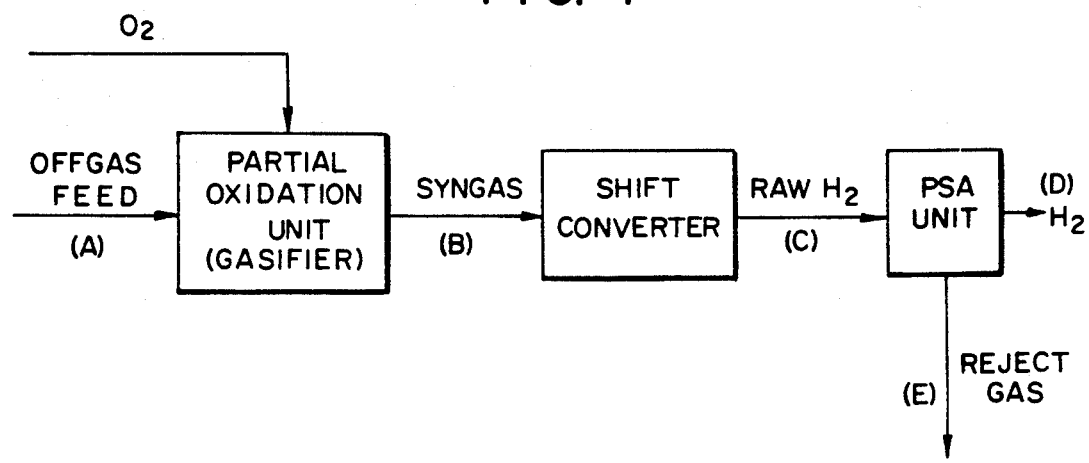
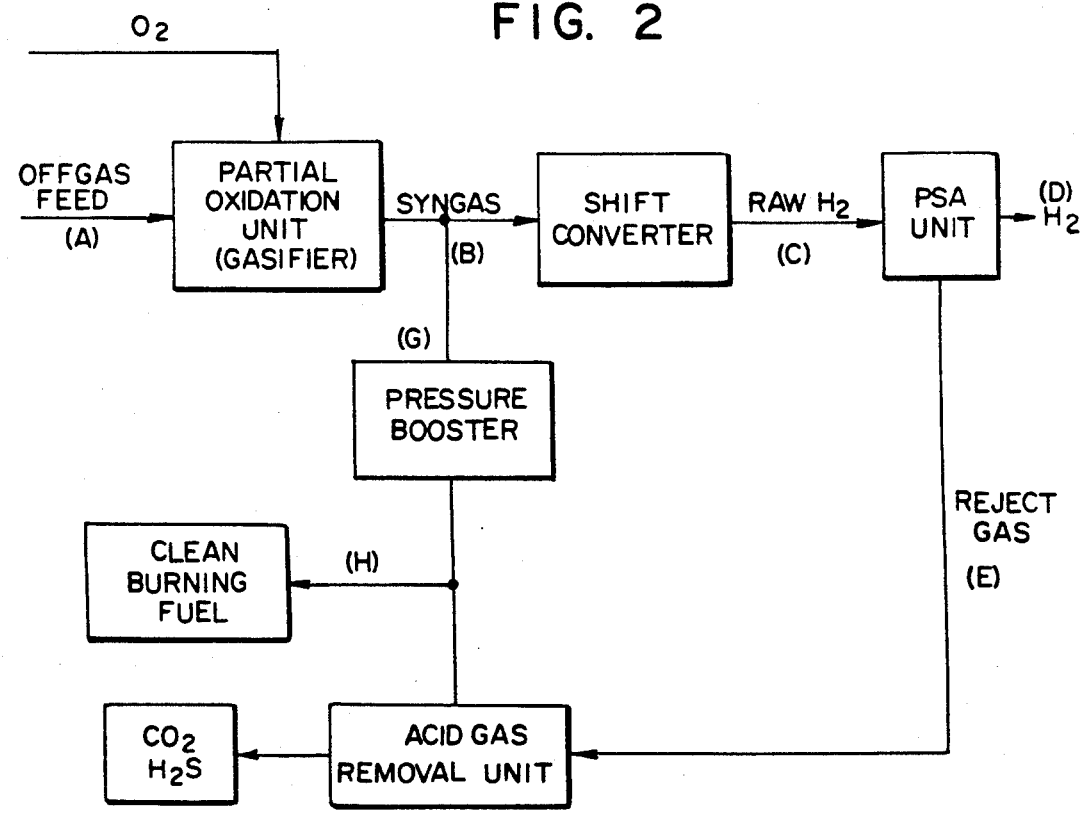

PROCESS FOR PRODUCING HIGH PURITY HYDROGEN

BACKGROUND OF THE INVENTION

1. Field of the Invention

The present invention relates generally to a process for producing hydrogen and, more particularly, to a process for producing high purity hydrogen from a refinery offgas feedstock.

2. Description of Background Art

There are a variety of known processes for producing hydrogen. Some of the more frequently employed processes include steam reforming of natural gas or naphtha, catalytic reforming of hydrocarbons boiling in the range of heavy straight run (HSR) gasoline or heavy oils (e.g., fuel oil), and the partial oxidation of heavy oils or natural gas. Steam reforming of natural gas is perhaps the most widely employed process for producing hydrogen. The cost of natural gas as a feedstock in processes to produce hydrogen is large, when compared to the alternative provided by the process of this invention.

To our knowledge, the use of the refinery offgas described hereinbelow as a feedstock for the production of high purity hydrogen in any currently known process, including those mentioned above, has never been offered. In fact, refinery offgas is characteristically unsuited to function well as a feed in steam or catalytic reforming. In particular, because of the high olefin content of refinery offgas it cannot be fed to a steam reformer, since the activity of the reforming catalyst rapidly becomes spent due to excess coking. Furthermore, due to the low $H_2$ content and the high $N_2$ and carbon oxides content of refinery offgas, it is difficult to recover $H_2$ from an offgas feed. The presence of sulphur, usually in the form of hydrogen sulphide, in offgas feeds can also present a problem, insofar as the added step of removing sulphur from the feed is necessary, since the catalysts used in the known processes for steam reforming are highly sulphursensitive. Similarly, the presence of nitrogen in offgas is problematic since it can be poisonous to some of the hydrogen processing catalysts.

Until now, refinery offgas had very little value and, in fact, imposed a liability on the operator of the refinery, since it must be safely disposed of to comply with environmental regulations due to soot formation by olefins and other unsaturates, such as diolefins and aromatics. Typically, a portion of refinery offgas is used as a supplement fuel to fire the furnaces in a refinery installation and the excess, which is abundant, must be flared. Again, however, because of the high olefin content of refinery offgas, the flame produced can result in undesirable levels of soot.

U.S. Pat. No. 3,545,926 describes a process for generating hydrogen from liquid hydrocarbons by partial oxidation followed by a water gas shift reaction and carbon dioxide removal.

U.S. Pat. No. 3,874,592 describes a burner for the partial oxidation of hydrocarbons to synthesis gas.

Accordingly, a constructive and profitable use of refinery offgas, which, at the same time, eliminates the need for its safe disposal, provides a remarkable advantage to those skilled in the art.

SUMMARY OF THE INVENTION

The present invention is directed to a process for producing high purity hydrogen which comprises (1) partially oxidizing a refinery offgas feedstock to produce a synthesis gas mixture of carbon monoxide and hydrogen, (2) reacting said synthesis gas mixture with steam to convert said carbon monoxide into a raw gas mixture which primarily includes carbon dioxide and hydrogen, and (3) purifying said raw gas mixture to produce high purity hydrogen and a reject gas mixture of impurities.

In another embodiment, the process of this invention further comprises recycling part of the reject gas mixture of impurities in a manner such that the reject gas mixture comingles with the synthesis gas mixture, whereby the reject gas mixture is permitted to react with steam to convert carbon monoxide remaining in the reject gas mixture into hydrogen and carbon dioxide, thereby enhancing the production of high purity hydrogen.

In another embodiment, the process of the present invention further comprises recovering a substantial amount of hydrogen sulphide present in the reject gas mixture and processing the hydrogen sulphide to produce elemental sulphur.

In still another embodiment, the process of the present invention further comprises directing the reject gas mixture to a burner to enable the reject gas mixture to be used as a clean burning fuel source. The fuel can be employed as a source of energy to preheat the partial oxidation feedstock, or for other purposes in the refinery.

Accordingly, the process of the present invention offers those skilled in the art an economical way of producing high purity hydrogen. The constructive and profitable use of refinery offgas described hereinbelow not only results in the production of high purity hydrogen, but it also adequately circumvents the requirement of safe disposal imposed by environmental regulations.

BRIEF DESCRIPTION OF THE DRAWINGS

FIG. 1 is a schematic illustration of the steps involved in practicing the process of the present invention; and FIG. 2 is a schematic illustration of an alternative embodiment of the present invention.

DESCRIPTION OF THE PREFERRED EMBODIMENTS

The feedstock used in the process of this invention is generally described as refinery offgas. Alternatively, the feed has been referred to as waste gas, vent gas, net gas or tail gas. Refinery offgas, as used herein, generally refers to the various gas streams generated by the individual processing units which are typically present in a refinery. Refinery offgas generally contains saturated and unsaturated hydrocarbons and other impurities, such as organic sulphur, nitrogen species, and inorganic agents including $H_2S$, $COS$, $SO_x$, $NH_3$, $HCN$, and arsine. Some particular components include $H_2$, $N_2$, $O_2$, $RSH$, $CH_4$, $C_2H_4$, $C_2H_6$, $C_3H_6$, $C_3H_8$, $C_4H_8$, $C_4H_{10}$, $C_5H_{10}$, $C_5H_{12}$, $CO$, $CO_2$, and $H_2O$. The processing units which can produce offgas and, hence, the feed for the instant process, can include the fluid catalytic cracking (FCC) unit, thermal cracking units such as a residual coking, delayed coking or fluidized coking units, the catalytic reforming (CR) unit, the hydrotreating (HT) unit, and the pressure swing adsorption (PSA) unit. The offgas stream from the FCC unit is particularly preferred.

Refinery offgas is generally characterized as including up to about 40 percent by volume of hydrogen and typically has an energy value of at least about 700 Btu/SCF. Where a waste gas stream contains more than 40 percent by volume of hydrogen, it is generally preferred to recover a portion of the hydrogen by, for instance, pressure swing adsorption and, thereafter employ the reject gas, which now contains less than 40 percent by volume of hydrogen, as the feedstock in the process of the present invention.

Table I is provided to illustrate the concentration of the components present in the offgas feedstock. A typical composition of a preferred offgas stream from a FCCU cryogenic residue unit is also provided in Table I.

TABLE I

| Component | Mole Percent Range | FCC Unit Offgas* |
|---|---|---|
| $H_2$ | 8-40 | 19.54 |
| $N_2$ | 0-10 | 7.41 |
| $CH_4$ | 20-60 | 40.47 |
| $C_2H_4$ | 1-25 | 17.79 |
| $C_2H_6$ | 1-20 | 14.37 |
| $C_3H_6$ | 0-20 | 0.06 |
| $C_3H_8$ | 0-20 | 0.37 |
| $C_4H_8$ | 0-5 | — |
| $C_4H_{10}$ | 0-8 | 1.0 |
| $C_5+$ | 0-5 | — |
| CO | 0-5 | 1.0 |
| $CO_2$ | 0-5 | 250 ppm |
| $O_2$ | — | 1000 ppm |
| Acetylene | — | 100 ppm |
| Diolefins | — | 100 ppm |
| Aromatics | — | 200 ppm |
| RSH (mercaptans) | — | 10 ppm |
| $H_2S$ | 0-4 | 10 ppm |
| COS | 0-1 | 10 ppm |
| $SO_x$ | — | 15 ppm |
| $NH_3$ | — | 5 ppm |
| HCN | — | 10 ppm |
| Arsine | — | 20 ppb |
| Btu/SCF | 700-1400 | 1027 |

*Values represent mole percent unless indicated otherwise.

The presence of arsenic, appearing as arsine ($AsH_3$), in a refinery offgas is dependent on crude source. However, as more "less-desirable" heavier crudes find their way into refineries, the more likelihood arsenic will be found. In particular, shale oil recovered from the retorting of oil shale has been found to contain arsenic. With the increasing concerns for the environment, it is important that materials, such as arsenic, be isolated before they are discharged to the environment. The process of the present invention further satisfies this objective.

Although the preferred offgas feed used in the present process is of FCC origin, it is to be understood that offgases from other petroleum and chemical processing units can be used and may also contain species which require removal or destruction before the offgas can be combusted. For example, waste gas streams containing organic nitrogen compounds, such as amines or nitriles, when burned (fully combusted) produce $NO_x$ in amounts that exceed environmental discharge limits. Advantageously, in accordance with the present invention, the partial oxidation of organic nitrogen compounds generates only nitrogen, a limited amount of ammonia, and a trace of hydrogen cyanide. The latter fixed nitrogen compounds are easily separated and $NO_x$ formation on burning the syngas containing only $N_2$ is minimized.

In the practice of the present invention, the offgas feed is preheated to a temperature of between about 200° F. to 700° F. The offgas can be heated, for instance, in a fire heater or a heat exchanger.

In the first step of the present process, the offgas feed is partially oxidized to produce a synthesis gas mixture of carbon monoxide and hydrogen. More specifically, as shown in FIG. 1, the preheated offgas feed is charged into a partial oxidation unit at a rate of about 4 million to about 40 million standard cubic feet per day (mmscfd). The pressure of the offgas feed corresponds to the desired pressure of the end product, i.e., the hydrogen. As shown, the partial oxidation unit is also charged with an $O_2$ stream to permit the partial oxidation of the offgas feed. The $O_2$ is introduced separately from the offgas feed into the partial oxidation unit by a partial oxidation burner, such as the one described in U.S. Pat. No. 3,874,592. The oxygen consumption rate is typically between about 100 tons per day to about 1200 tons per day which, advantageously, is about 10 to about 25 percent lower than the $O_2$ consumption rate required to partially oxidize similar quantities of natural gas, oil or coal feedstocks. The offgas feed stream has a minimum energy value of 700 Btu/SCF, more typically 800 2 to 1400 Btu/SCF and, accordingly, functions well as a feedstock to a partial oxidation unit; specifically, the instant offgas feed can be partially oxidized quite easily because of its heating value.

In a preferred embodiment, the partial oxidation unit is a gasifier which includes a refractory-lined pressure vessel and auxiliary gas cooling means, such as a heat recovery steam generator or a quenching chamber, which is further discussed hereinbelow. The gasifier is typically operated at a temperature of about 2200° F. to about 2800° F. and a pressure of from about 200 psig to about 1200 psig. The residence time of the reactants in the partial oxidation unit is usually about 2 to about 4 seconds. Thus, a predetermined quantity of the offgas is partially oxidized in the gasifier in about 2 to about 4 seconds. In the partial oxidation unit, synthesis gas ("syngas") (i.e., carbon monoxide and hydrogen) is produced, preferably in an amount of at least about 2.0-3.5 moles of syngas per mole of offgas feed.

Internal steam is also generated in the partial oxidation unit (gasifier), which is advantageously employed in the shift converter as described with particularity below. Before the syngas exits the partial oxidation unit, it is cooled in a quenching medium, such as water. The means for quenching the syngas (e.g., quench bath) can be contained in the partial oxidation unit or, alternatively, can be disposed outside of the unit and positioned in a manner such that the syngas can be directed through the quenching means and, thereafter, directed into the carbon monoxide shift converter.

With this partial oxidation operation, the volume of the synthesis gas product is at least two (2) times the volume of the offgas feed. Thus, the nitrogen content of the syngas is diluted at least twofold. Significantly, it is more efficient and easier to remove the diluted quantities of nitrogen The syngas mixture generated in accordance with the present invention, i.e., generated with the offgas feedstock, includes a hydrogen content of at least about 59 percent by volume and a carbon monoxide content of at least about 30 percent by volume. Contrariwise, the syngas mixture resulting from the partial oxidation of a natural gas or oil feedstock includes an $H_2$ concentration of about 48 percent and a CO concentration of about 43 percent. The syngas mixture generated in accordance with the present process is desired since more hydrogen is produced and less CO is produced, which means that the CO shift converter is used less.

In the next step, the syngas stream is directed from the partial oxidation unit into the shift converter. More particularly, hot synthesis gas from the gasifier is quickly cooled by direct contact with water, as described above, at the pressure of the synthesis gas generator (gasifier) and passed directly to the carbon monoxide shift conversion reactor. As described in U.S. Pat. No. 3,545,926, sufficient water is vaporized into the hot synthesis gas to supply the steam required for the shift conversion reaction. The steam is reacted with the carbon monoxide present in the syngas to produce a raw gas mixture of carbon dioxide and hydrogen. With operating pressures circa 1000 psi, the equilibrium temperature of the quenched synthesis gas is near 500° F. Since the shift converter operates at temperatures from 500 to 950° F., preferably 550° F. to 900° F., it may be necessary to warm the inlet gas to the shift converter by heat exchange against the exit gas. The carbon monoxide shift reaction which produces hydrogen and carbon dioxide is slightly exothermic and the temperature of the gas rises across the shift catalyst to a temperature circa 700° F. to 950° F., depending upon the amount of carbon monoxide present and equilibrium conditions.

In a preferred embodiment, at least about ninety (90) percent of the carbon monoxide is converted to carbon dioxide and hydrogen. The shift conversion reaction is preferably conducted in one or more fixed-bed catalytic reactors disposed in the shift converter. In the present process, the shift conversion reaction advantageously occurs in two stages or, more appropriately, two shifts. Typically, a three (3)-stage shift conversion is employed in conventional processes for producing high purity hydrogen. Where more than one fixed-bed reactor is employed, cooling means, which by way of illustration can include an intercooler or a heat exchanger, are positioned between the various beds to prevent the temperature from getting too high, as this would adversely affect the equilibrium conversion. It is desirable to maintain the reaction temperature within a range of about 600° F. to about 1000° F. in the first shift (or stage) and from about 500° F. to about 800° F. in the second shift. Preferably, the temperature is maintained at about 850° F. in the first shift and about 650° F. in the second shift.

The catalyst employed in the shift conversion reaction preferably includes chromium and iron oxide as is known by those skilled in the art. This catalyst is used to promote the following shift reaction: $CO + H_2O \rightarrow CO_2 + H_2$.

The shift conversion reactor serves to destroy or retain unwanted contaminants present in the feedstock. For example, hydrogen cyanide is hydrolyzed to form ammonia, hydrogen and carbon dioxide. If arsenic is present or suspected in the refinery offgas, then the carbon monoxide shift conversion catalyst should be protected by a suitable guard bed to remove the arsenic materials from the synthesis gas. A suitable guard bed material is a hydrotreating catalyst, such as a cobalt, molybdenum or alumina catalyst, operated at a temperature approximately 50° F. above the dew point of the quenched synthesis gas.

The next step of the present process involves purifying the raw gas mixture produced in the shift conversion reaction described above. The gas effluent exiting the shift converter consists primarily of raw carbon dioxide and hydrogen. Impurities present in the raw gas mixture typically include nitrogen, carbon monoxide, methane, hydrogen sulphide, and water. After the synthesis gas has been treated in the carbon monoxide shift converter, it is cooled to remove water. Any chloride, now present as HCl, and ammonia condense out with the water and are removed from the gas. Accordingly, the impure gas effluent is directed from the shift converter into a hydrogen purification unit to remove remaining impurities from the raw effluent stream.

Any conventional means for effecting the purification can be employed. However, in a most preferred embodiment, the purification unit employed is a Pressure Swing Adsorption (PSA) unit (as shown) which removes the impurities from the raw stream by use of a pressure change on the adsorbent beds. This facilitated means of acid-gas removal and hydrogen purification is another significant feature of the present invention. In conventional processes, the raw stream would typically undergo treatment with an amine solution, followed by a methanation process, followed by a copper liquor washing process and, finally, followed by a molecular sieve dryer process. While the preferred means for effecting the purification of the raw effluent stream is by way of the PSA unit, it is to be understood that conventional means for purifying the raw $H_2$ stream can be employed, if desired, in the process of the present invention.

As shown in FIG. 1, two effluent streams emerge from the PSA unit. One of the streams is a reject gas which includes the separated impurities, such as $N_2$, $CO_2$, CO, $CH_4$, $NH_3$, and $H_2S$. Also included in the reject gas stream is a small amount of unrecovered $H_2$.

The second stream emerging from the PSA unit is high purity hydrogen. The hydrogen produced by the process of this invention is at least about 99 percent pure. The high purity hydrogen produced is recovered using conventional means and can be used in a variety of applications. These include, but are not limited to, hydrotreating, hydroprocessing, hydrocracking, methanol production, oxoalcohol production, isomerization processes, etc.

The process of this invention includes additional embodiments which essentially involve the optional treatment and/or use of the reject gas exiting the PSA unit. It is to be understood that in each of the additional embodiments described below, practice of the invention includes the process steps described above.

In one such additional embodiment, the reject gas is recycled to the shift converter to enhance the recovery of hydrogen. This embodiment can enhance the recovery of hydrogen by about 5 to about 10 percent. In particular, referring to FIG. 2, the reject gas exiting the PSA unit is first fed to an acid gas removal unit to recover carbon dioxide as a by-product and hydrogen sulfide prior to entering the CO shift converter. Acid gas removal can be effectuated by the well known Benfield Process or amine solution processes, where the operative amine solutions include monoethanolamine (MEA), diethanolamine (DEA) or Selexol, a polyethoxyether. A portion of the reject gas from the acid gas removal unit is boosted in pressure in a pressure booster and then directed into the shift converter, either by introducing it into the syngas feed stream (as shown) or, alternatively, by directly introducing it into the shift converter. In any event, the objective is to permit the reject gas to co-mingle with the synthesis gas mixture so that the reject gas is permitted to react with the steam in the shift converter to convert carbon monoxide present in the reject gas into the raw gas mixture described above.

Inasmuch as it is necessary to provide a means to remove inert gases, such as nitrogen, from the system, part of the reject gas from the acid gas scrubber is drawn off as shown at stream (H). Since this stream contains essentially only methane, carbon monoxide and hydrogen in addition to nitrogen, it is clean burning fuel.

The amount of clean burning fuel stream (H) which can be used as fuel is dependent on the amount of nitrogen present. It is to be noted that the heating value of the bleed gas (stream (H)) needs to be maintained at not less than 150 Btu/SCF, preferably 250 Btu/SCF to produce a good quality fuel. Generally, sufficient acid gas scrubber reject gas should be drawn off to keep the nitrogen content below 30 percent. Removal of the acid gases, in particular the carbon dioxide, prior to diversion to fuel greatly improves the heating quality of the gas, as well as improve recovery of hydrogen from that portion of the acid gas scrubber reject gas reinjected into the carbon monoxide shift converter feed.

In a second alternative embodiment, the reject gas is directed from the purification unit (e.g., PSA unit) to a burner where it can be used as a fuel source to preheat feedstreams, such as the refinery offgas, to the partial oxidation unit or to the carbon monoxide shift unit or for other processing units in the refinery installation. From the environmental perspective, the reject gas from the PSA unit is a better fuel source than the refinery offgas exiting the refinery processing units, for instance, the FCC unit. As stated above, refinery offgas has a high unsaturated hydrocarbon content which, when burned, generates a flame that produces soot. Since the reject gas from the PSA unit is completely devoid of olefins and other unsaturates, the flame it produces when heated does not produce nearly the same levels of soot.

In a third alternative embodiment, the PSA unit reject gas is treated to remove hydrogen sulphide which can subsequently be processed to obtain elemental sulphur. This embodiment is particularly beneficial where there are relatively considerable amounts of hydrogen sulphide in the offgas feed. The hydrogen sulphide can be removed from the PSA unit reject stream in any known manner. One way of effectuating its removal includes directing the reject stream through an acid-gas scrubber to remove any hydrogen sulphide from the reject stream.

The removal of hydrogen sulphide from the PSA unit reject gas is preferred over removing it from the refinery offgas. Where sulphur is present in the original offgas feed, it is usually combined in part with organic matter, making its removal more difficult than it would be to remove hydrogen sulphide from the PSA via acid gas scrubbing. The sequence of gasification followed by conversion shifting makes sulphur more available by acid gas extraction.

Elemental sulphur can be produced in any known manner; oxidation processes, such as the Claus system, are generally preferred.

The following examples are offered to further illustrate the manner and means for practicing certain embodiments of the present invention.

EXAMPLE I

This example is offered to illustrate a preferred manner of practicing the process of the present invention without the optional recycle step. In Table II, preferred pressure, temperature and flow rate parameters are provided for each of the gas streams involved in the process. In Table III, the components which are included in each gas stream are provided in moles on a dry basis. In both Table II and Table III, each gas stream is represented by a written character as follows:

A—offgas feed entering the partial oxidation unit
B—gas effluent from the partial oxidation unit (primarily syngas) which enters the shift converter
C—gas effluent from the shift converter which enters the purifier (e.g., PSA Unit)
D—high purity $H_2$ stream from the purifier
E—reject gas stream (tail gas) from the purifier

TABLE II

| Parameters | Gas Streams | | | | |
|---|---|---|---|---|---|
| | A | B | C | D | E |
| Pressure (psig) | 450 | 425 | 400 | 390 | 5 |
| Temperature (°F.) | 600 | 650 | 100 | 110 | 90 |
| Flow (mmscfd) | 11.4 | 36.5 | 47.9 | 30 | 17.9 |

TABLE III

| Component | Gas Streams | | | | |
|---|---|---|---|---|---|
| | A | B | C | D | E |
| $H_2$ | 17.5 | 59.3 | 71.0 | 99.75 | 22.8 |
| $N_2$ | 6.6 | 2.0 | 2.0 | 0.25 | 4.9 |
| $CH_4$ | 36.0 | 2.5 | 2.7 | — | 7.2 |
| $C_2H_4 + C_2H_6$ | 28.7 | — | — | — | — |
| $C_3H_6 + C_3H_8$ | 8.2 | — | — | — | — |
| $C_4H_8 + C_4H_{10}$ | 2.0 | — | — | — | — |
| $C_5+$ | 1.0 | — | — | — | — |
| CO | — | 35.6 | 3.4 | — | 9.1 |
| $CO_2$ | — | 0.6 | 20.9 | — | 56.0 |
| $H_2O$ | unsat.d | sat.d | sat.d | dry | sat.d |

EXAMPLE II

This example is offered to illustrate a preferred manner of practicing an alternative embodiment of the process of this invention which includes the optional step of recycling the reject gas from the PSA unit through an acid gas removal unit and then into the syngas stream before it enters the shift converter, to enhance the recovery of $H_2$. Tables IV and V show the operating parameters and the components concentration in moles on a dry basis, respectively. Streams A-E are the same as used in Tables II and III. In Tables IV and V, gas streams F, G and H are representative of the following:

F—carbon dioxide stream from the acid gas removal unit
G—slipstream effluent from the $CO_2$ removal unit which re-enters the shift converter along with unconverted syngas
H—stream of offgas effluent from the $CO_2$ removal unit taken to control buildup of inerts (nitrogen) in system, used as clean burning fuel

TABLE IV

| Parameters | Gas Streams | | | | | | | |
|---|---|---|---|---|---|---|---|---|
| | A | B | C | D | E | F | G | H |
| Pressure (psig) | 450 | 425 | 400 | 390 | 5 | 5 | 425 | 5 |
| Temperature (°F.) | 600 | 650 | 100 | 110 | 90 | 90 | 100 | 100 |

TABLE IV-continued

| Parameters | Gas Streams | | | | | | | |
|---|---|---|---|---|---|---|---|---|
| | A | B | C | D | E | F | G | H |
| Flow (mmscfd) | 10.9 | 34.8 | 49.6 | 30 | 19.6 | 11.7 | 3.4 | 4.5 |

TABLE V

| Components | Gas Streams | | | | | | |
|---|---|---|---|---|---|---|---|
| | A | B | C | D | E | F | G & H |
| $H_2$ | 17.5 | 59.3 | 68.7 | 99.75 | 20.6 | — | 56.0 |
| $N_2$ | 6.6 | 2.0 | 2.3 | 0.25 | 5.4 | — | 13.0 |
| $CH_4$ | 36.0 | 2.5 | 3.1 | — | 7.8 | — | 19.0 |
| $C_2H_4 + C_2H_6$ | 28.7 | — | — | — | — | — | — |
| $C_3H_6 + C_3H_8$ | 8.2 | — | — | — | — | — | — |
| $C_4H_8 + C_4H_{10}$ | 2.0 | — | — | — | — | — | — |
| $C_5+$ | 1.0 | — | — | — | — | — | — |
| CO | — | 35.6 | 2.6 | — | 6.5 | — | 12.0 |
| $CO_2$ | — | 0.6 | 23.2 | — | 59.7 | 100 | — |
| $H_2O$ | unsat.d | sat.d | sat.d | dry | sat.d | — | — |

What is claimed is:

1. A process for producing high purity hydrogen consisting essentially of (1) partially oxidizing a refinery offgas feedstock at a temperature of about 2200° F. to about 2800° F. and in the absence of a catalyst, to produce a synthesis gas mixture of carbon monoxide and hydrogen, (2) reacting said synthesis gas mixture with steam to convert to convert said carbon monoxide into a raw gas mixture which primarily includes carbon dioxide and hydrogen, and (3) purifying said raw gas mixture by pressure swing adsorption to produce high purity hydrogen and a reject gas mixture of impurities.

2. The process of claim I wherein said refinery offgas feedstock includes $H_2$, $N_2$, $O_2$, RSH, $CH_4$, $C_2H_6$, $C_3H_6$, $C_3H_8$, $C_4H_8$, $C_4H_{10}$, $C_5H_{10}$, $C_5H_{12}$, CO, $CO_2$, $H_2O$, $H_2S$, COS, $NH_3$, HCN, olefins, diolefins, acetylenes, aromatics and arsenic.

3. The process of claim 1 wherein said refinery offgas feedstock includes up to about 40 percent by volume of hydrogen.

4. The process of claim 1 wherein said refinery offgas feedstock includes from about 8 to about 40 mole percent of $H_2$, from about 0 to about 10 mole percent $N_2$, from about 20 to about 60 mole percent $CH_4$, from about to about 25 mole percent $C_2H_4$, from about 3 to about 20 mole percent $C_2H_6$, from about 1 to about 10 mole percent $C_3H_6$, from about 1 to 32 bout 10 mole percent $C_3H_8$, from about 0.2 to about 5 mole percent $C_4H_8$, from about 0.2 to about 8 mole percent $C_4H_{10}$, from about 0 to about 1 mole percent CO, from about 0 to about 2 mole percent $CO_2$, from about 0 to about 4 mole percent $H_2S$ and $H_2O$.

5. The process of claim 1 wherein said refinery offgas is derived from a fluid catalytic cracking unit, a residual coking unit, a delayed coking unit, a fluidized coking unit, a catalytic reforming unit, a hydrotreating unit, or a pressure swing adsorption unit.

6. The process f claim 1 which further comprises preheating said refinery offgas feedstock to a temperature of about 200° F. to about 700° f. prior to the step of partially oxidizing said refinery offgas feedstock.

7. The process of claim 1 wherein said refinery offgas feedstock is partially oxidized by introducing said feedstock into a partial oxidation unit at a rate of about 4 million to about 40 million square cubic feet per day, said unit including a means for receiving oxygen into said unit to permit the oxidation of said feedstock.

8. The process of claim 7 wherein said oxygen is employed in said partial oxidation unit at a consumption rate of between about 100 tons per day to about 1200 tons per day.

9. The process of claim 7 wherein said partial oxidation unit comprises a gasifier.

10. The process of claim 9 wherein said feedstock is partially oxidized in said gasifier at a pressure of about 200 psig to about 1200 psig.

11. The process of claim 7 wherein said feedstock remains in said partial oxidation unit to produce said synthesis gas mixture for about 2 to about 4 seconds.

12. The process of claim 1 wherein said refinery offgas feedstock has an energy value of about 700 to about 1400 Btu per square cubic feet.

13. The process of claim 1 wherein said synthesis gas mixture is produced in an amount of at least about 2.0 to about 3.5 moles of synthesis gas per mole of said offgas feedstock.

14. The process of claim which further comprises quenching said synthesis gas mixture prior to performing step (2).

15. The process of claim 1 wherein said synthesis gas mixture comprises at least about 59 percent by volume hydrogen and at least about 30 percent by volume carbon monoxide.

16. The process of claim 1 wherein the steam employed in step (2) is generated from the partial oxidation of said offgas feedstock.

17. The process of claim 1 whereby at least about 90 percent of said carbon monoxide is converted into said raw gas mixture.

18. The process of claim 1 wherein the conversion of carbon monoxide into said raw gas mixture occurs in two stages.

19. The process of claim 18 wherein the reaction occurring in the first stage takes place at a temperature of about 600° F. to about 1000° F. and the reaction occurring in the second stage takes place at a temperature of about 500° F. to about 800° F.

20. The process of claim 18 wherein the reaction occurring in the first stage takes place at a temperature of about 850° F. and the reaction occurring in the second stage takes place at a temperature of about 650° F.

21. The process of claim 1 wherein said high purity hydrogen is at least about 99 percent pure.

22. The process of claim 1 which further comprises recycling said reject gas mixture of impurities in a manner such that said reject gas mixture co-mingles with said synthesis gas mixture, whereby said reject gas mixture is permitted to react with steam to convert any excess carbon monoxide remaining in said reject gas mixture into hydrogen and carbon dioxide, thereby enhancing the production of high purity hydrogen.

23. The process of claim 22 which further comprises recovering a substantial amount of carbon dioxide present in said reject gas mixture prior to the step of recycling said reject gas mixture, in order to maximize the conversion of said excess carbon monoxide.

24. The process of claim which further comprises directing said reject gas mixture to a burner to enable said heated reject gas mixture to be used as a fuel source.

25. The process of claim 1 which further comprises recovering a substantial amount of hydrogen sulphide present in said reject gas mixture and processing said hydrogen sulphide to produce elemental sulphur.

26. The process of claim 25 wherein said amount of hydrogen sulphide is recovered by directing said reject gas mixture through an acid-gas scrubber in a manner such that said hydrogen sulphide is removed from said reject gas mixture.

* * * * *